United States Patent [19]

Clark et al.

[11] 4,220,950

[45] Sep. 2, 1980

[54] AIR FLOW SENSOR

[75] Inventors: Scott A. Clark; William E. Ulmer, both of Cedar Rapids, Iowa

[73] Assignee: S. A. Clark & Associates, Marion, Iowa

[21] Appl. No.: 974,214

[22] Filed: Dec. 29, 1978

[51] Int. Cl.² .............................................. G08B 19/00
[52] U.S. Cl. ...................................... 340/594; 340/608; 340/654; 340/664; 340/679
[58] Field of Search ............... 340/594, 679, 664, 635, 340/608, 606, 654

[56] References Cited

U.S. PATENT DOCUMENTS

| | | |
|---|---|---|
| 2,663,859 | 12/1953 | MacInnes et al. ................... 340/664 |
| 2,736,884 | 2/1956 | Yeomans .............................. 340/664 |
| 3,196,679 | 7/1965 | Howland .............................. 340/606 |

Primary Examiner—Glen R. Swann, III

Attorney, Agent, or Firm—Hill, Van Santen, Steadman, Chiara & Simpson

[57] ABSTRACT

An air flow sensor has a hollow tubular housing partially filled with potting compound and having a printed circuit board mounted in the compound inside the tube. The board is mounted such that two power resistors and a first heat sensing switch mounted on the board are embedded in the potting compound, and a second heat sensing switch mounted on the board above the compound is in contact with the ambient atmosphere. The power resistors are connected in parallel to a power source driving a fan, and the first switch has an actuation temperature selected to activate the switch when the power resistors radiate a selected amount of heat. The second switch also has an actuation temperature due to lack of air flow chosen to activate the switch when the ambient atmosphere reaches the designated temperature.

2 Claims, 3 Drawing Figures

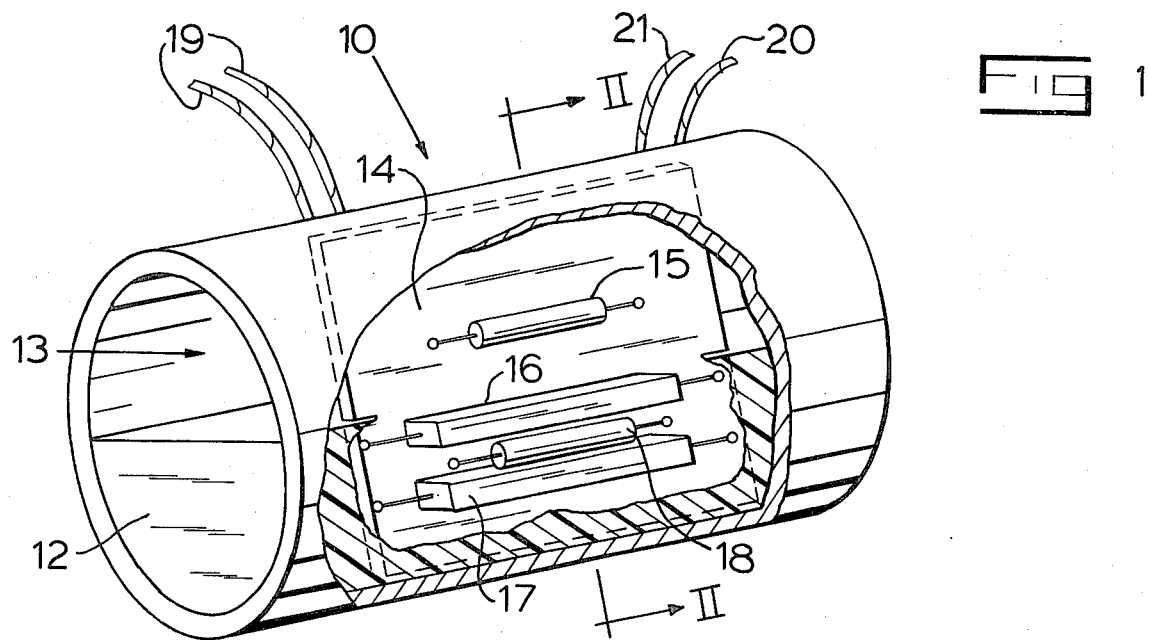
FIG 1
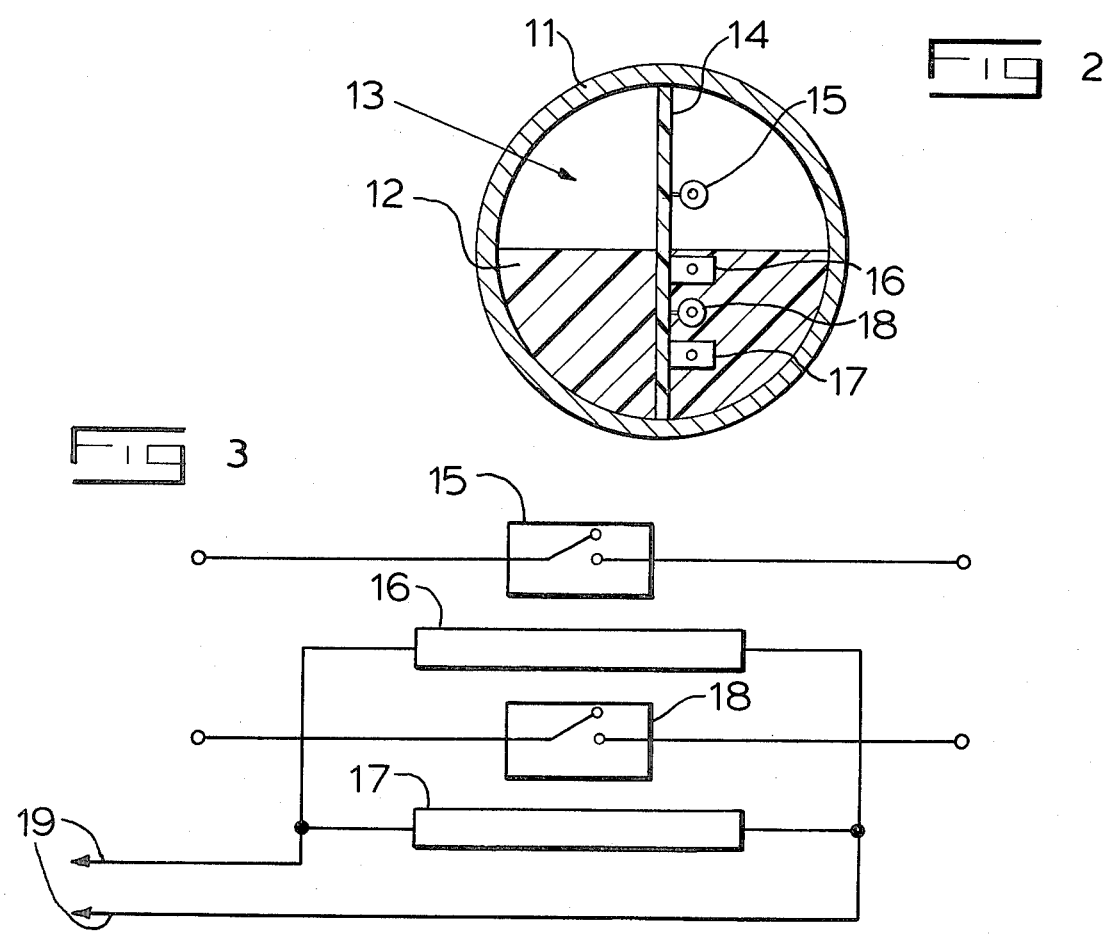
FIG 2
FIG 3

AIR FLOW SENSOR

BACKGROUND OF THE INVENTION

1. Field of the Invention

The present invention relates to air flow temperature sensing devices, and more particularly to air flow temperature sensing devices which form a portion of an alarm system for a fan.

2. Description of the Prior Art

Temperature activated switches and thermocouples which open or close or generate electricity at a designated temperature are known in the art as the basic components of temperature sensing devices. A particular problem is present in seeking to monitor the operation of a fan, because there are two different temperatures associated with the fan which must be in an acceptable range for proper operation. The first quantity which must be monitored is the power input to the fan motor. This is frequently monitored by needle-type volt meters, or by simply inserting a fuse in the input circuit to prevent overload.

The second quantity which must be measured is the temperature of air flow eminating from the fan blades. Monitoring the power input is insufficient because power may still be supplied to the motor, but the fan blades may not be turning due to motor malfunction or some obstruction. A single temperature sensing device cannot monitor both quantities, and therefore two such monitoring devices are needed.

No device in the art combines both a power input sensing device and an air flow sensing device in combination in a unit which may be separately mounted outside of the fan or motor housing.

SUMMARY OF THE INVENTION

The present invention provides an air flow sensor and power sensor in combination to monitor the operation of a fan. In closed environments, such as an airplane cockpit or a building housing livestock, proper operation of cooling fans is essential to protect the occupants from prolonged exposure to high temperatures. The present invention provides a single unit which monitors the power input to the fan and the temperature of the air flow output of the fan blades the latter measurement being an indicator of air flow movement through the unit. The unit may be connected to an alarm system which either activates visual or audio alarms to signal that manual correction of the problem is needed, or may alternatively be connected to a unit which automatically takes steps to correct the problem.

In accordance with the principles of the present invention, a hollow tube is partially filled with potting compound and a printed circuit board is mounted in the potting compound. The circuit board has a number of components thereon, in particular a pair of power resistors and a first sensing switch which are embedded in the potting compound. The resistors are connected in parallel to to each other and in series between a power supply and radiate heat when the power supply and said fan is operational. The first switch may be in a normally open or normally closed state, and is activated to an opposite state when a designated temperature is produced by the resistors. A power interruption will decrease the heat output, and cause the first switch to change state and activate corrective devices.

A second heat sensing switch is mounted on the circuit board above the potting compound in the tube, and is surrounded by ambient atmosphere. The sensor is placed in the air flow of a fan so that air from the fan blades moves through the sensor and across the second switch. If the air flow stops, causing the air temperature to move above a pre-selected temperature, the second heat sensitive switch changes state to activate an alarm or trigger other corrective devices.

The switches may be conventional heat sensing switches, such as compound bar switches. A thermocouple attached to a triggering device may be substituted for each switch so that an alarm is activated only when the thermocouple produces a selected amount of electricity due to an increased temperature of the surrounding material.

BRIEF DESCRIPTION OF THE DRAWINGS

FIG. 1 is a perspective view, partly broken away, of an air flow sensor.

FIG. 2 is a sectional view taken along line II—II of FIG. 1.

FIG. 3 is a schematic diagram of the circuitry embodied in FIG. 1.

DESCRIPTION OF THE PREFERRED EMBODIMENTS

An air flow sensor is generally shown at 10 in FIG. 1. The sensor 10 consists of a hollow tube 11 which is partially filled with a potting compound 13 so that an empty space 13 remains above the compound 12.

A printed circuit board 14 is embedded in the tube 11 in the potting compound 12. The printed circuit board 14 has a number of components mounted thereon, however, only the components pertaining to the operation of the present invention are depicted in FIGS. 1 and 2.

Mounted on the circuit board 14 below the surface of the potting compound 12 are a pair of power resistors 16 and 17 and a first heat sensing switch 18. The switch 18 is mounted between the resistors 16 and 17. The resistors are connected in parallel across terminals 19 leading to a power supply such as 115 VAC. The resistor 16 has an upper portion thereof which is substantially coplanar with the surface of the potting compound 12.

A second heat sensing switch 15 is also mounted on the circuit board 14, in the hollow area 13 of the tube 11. The switch 15 is thus in contact with the ambient atmosphere. A sensor line 20 connects the first sensing switch 18 to a monitoring device and a second sensor line 21 connects the second switch 15 to a monitoring device.

Operation of the sensing device is as follows. The terminals 19 of the device are connected in series with a power supply driving a fan. Flow of current through the resistors 16 and 17 will cause heat to be radiated therefrom which will be transmitted to the switch 18 through the potting compound 12. The switch 18 may be in either a normally open or normally closed state. As long as heat is radiated by the resistors 16 and 17 the switch 18 will remain in its initial state. Should a power interruption cause current to cease flowing in the resistors 16 and 17, the temperature surrounding the switch 18 will decrease, causing the switch to change state. The switch may be connected to an audio or visual alarm to signify that manual correction measures must be taken. The switch 18 may alternatively be connected to an automatic correction circuit, such as one which automatically activates a second fan to take the place of the non-functioning fan.

The second heat sensing switch 15 senses heat radiated from the resistor 16 and contained in the ambient atmosphere passing through the hollow portion 13 of the tube 11. The switch 15 may also be in either a normally open or normally closed state. If due to fan malfunction the air ceases movement and consequently is raised in temperature, the switch 15 will be activated and trigger a monitoring system similar to that connected to the switch 18. The sensor thus monitors and alerts a user to malfunctions in both the power input and the air flow output of a fan.

In place of the switches 15 and 18, a thermocouple and triggering device arrangement may be utilized, so that the alarm or other monitoring system is activated only when the thermocouple produces a designated pre-selected amount of electricity.

The resistor values and actuating temperatures of the resistors 16 and 17 and the switches 15 and 18 may be selected to meet individual requirements. It has been found to be desirable to activate the switch 18 when a temperature of 131° F. is achieved. For this actuating temperature, it is suggested that the resistor 16 be a 3,000 ohm, 10 watt resistor and the resistor 17 be a 7,000 ohm, 10 watt resistor. It is also suggested that if the sensor is to be utilized in a building containing livestock, that the switch 15 be activated at a temperature of 113° F. Such an actuation temperature for the switch 15 is compatible with the above suggested values for the other components of the sensor.

We claim as our invention:

1. A sensing device for monitoring a fan having a power input and an air flow output, said sensing device comprising:

a housing having apertures to admit said air flow;

a first means in said housing contact with said air flow for activating an alarm when said air is above a pre-selected temperature due to an absence of air movement; and a second means in said housing for activating an alarm when said power input is less than a pre-selected wattage level.

2. A sensing device for monitoring a fan having a power input and an air flow output, said sensing device comprising:

a housing having apertures to admit said air flow, said housing partially filled with a potting compound;

a circuit board mounted inside said housing in said potting compound;

a first power resistor mounted on said circuit board and completely embedded in said potting compound;

a second power resistor mounted on said circuit board and partially embedded in said potting compound;

a first compound-bar switch mounted on said printed circuit board and completely embedded in said potting compound between said first and second resistors;

a second compound-bar switch mounted on said printed circuit board above said potting compound in contact with said air flow;

said first and second resistors connected in parallel to each other and in series with said power input and said fan;

said first and second compound-bar switches each connected to an alarm means, such that a change in state of either switch activates said alarm means.

* * * * *